March 18, 1924.
C. A. FRAHM
CAKE CUTTER
Filed May 5, 1922
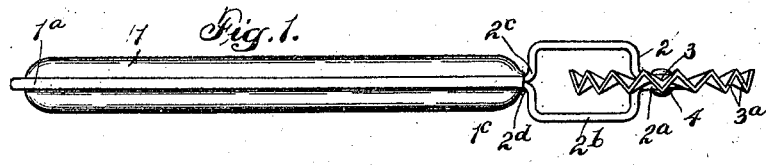
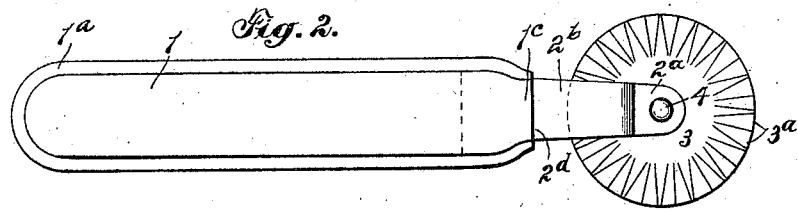
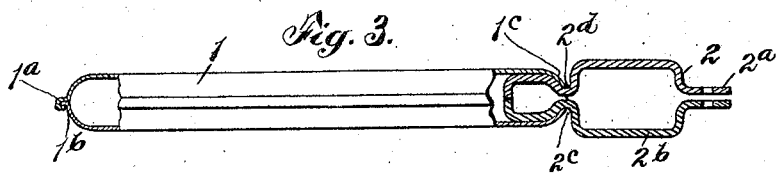
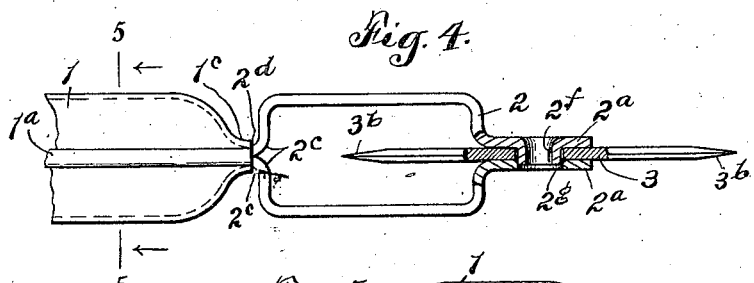
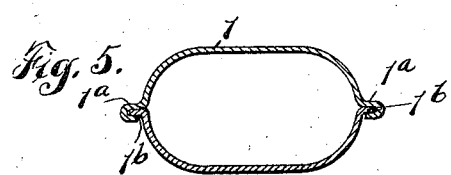
Inventor
Carl A. Frahm
By
Chas. C. Bielman, Attorney Patented Mar. 18, 1924.

1,487,226

UNITED STATES PATENT OFFICE.

CARL A. FRAHM, OF CANTON, OHIO.

CAKE CUTTER.

Application filed May 5, 1922. Serial No. 558,650.

*To all whom it may concern:*

Be it known that I, CARL A. FRAHM, a citizen of the United States, residing at Canton, in the county of Stark and State of Ohio, have invented certain new and useful Improvements in Cake Cutters, of which the following is a specification.

My invention relates to improvements in cake cutters, and more particularly to that class or type commonly known as "rotary cake cutters" for use in dividing or cutting dough into suitable strips or sections preparatory to baking or frying into suitably shaped cakes.

The primary object of the invention is to provide a generally improved device of the class indicated which will be exceedingly simple in construction, cheap of manufacture, and efficient in use.

A further and very important object is the provision of a cutter of this class of sheet metal throughout which will not only be durable and ornamental in appearance but which may be readily kept clean and sanitary.

A still further object is the provision of an improved hollow metallic handle together with an improved form of cutter carrying bearing head, said head and handle being provided with improved cooperating neck and recess portions with suitable anchor members adapted to mount and secure the handle and head portions in an improved manner.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1 is a top plan or edge view of a cake cutter constructed in accordance with this invention.

Fig. 2, a side elevation of the same.

Fig. 3, an edge view, partly in central longitudinal section, illustrating in particular the form and arrangement of the cutter carrying bearing head and the improved means of mounting and anchoring the same within the end of the handle.

Fig. 4, an enlarged edge view of a modified form of cutter carrying bearing head and cutter.

Fig. 5, a cross sectional view of the improved hollow or two-part handle taken on line 5—5 of Fig. 4.

Fig. 6, an edge view of the further modified form of rotary cutter or disc.

Similar numerals of reference designate like parts throughout all the figures of the drawings.

The improved cake cutter comprises a hollow sheet metal handle and a cutter carrying bearing head together with a suitable rotary cutter or wheel to be now described.

The improved handle comprises two complementary members 1, of channel shape in cross section with the channel or concave portions extending toward each other and connected longitudinally by means of longitudinally extending seams formed, in the present instance, by means of a hook shaped flange $1^a$, extending over an internally arranged flange $1^b$.

The improved cutter carrying bearing head comprises two companion or complementary bearing brackets 2, having bearing lugs $2^a$, and provided with outwardly offset sides $2^b$, the latter terminating in constricted neck portions $2^c$, conjointly forming handle receiving recesses $2^d$, and provided with enlarged anchor portions $2^e$. The anchor members $2^e$ abut against each other at one end and conjointly form an enlarged anchor head corresponding in contour to the inner end walls of the handle. As a means of securing the handle to the brackets 2, one end of the handle is formed over the head portions $2^e$, so that the end walls $1^c$ are seated in the recesses $2^d$ and the intervening opening or recess in the pointed portion $1^c$, receives and is closed by said constricted neck portions $2^c$ of the brackets 2.

The rotary cutter or wheel 3 may be of any suitable and convenient form and may be mounted in the brackets 2 in any suitable and convenient manner, as for example,—by means of a bearing element 4, extending through suitable openings in the lug members $2^a$ of the brackets and through a central opening in the wheel 3. The cutter 3 may be permanently attached within the brackets 2 and may be provided with radially extending corrugations terminating in angular tread portions $3^a$, to form notches in the dough or cake to be cut, as shown in Figs. 1 and 2 of the drawings, or, if desired, the outer periphery of the cutter wheel may have a plain cutting edge as at 3ᵇ, as shown in Fig. 4 of the drawings, and may be removably or demountably mounted by providing one of the lugs 2ᵃ with a struck out bearing lug 2ᶠ, to removably receive the bearing opening of the cutter 3, said bearing lug 2ᶠ being adapted to register with an opening 2ᵍ, in the opposite or companion bearing bracket and in which instance the brackets are sufficiently resilient to permit the outer bearing ends to be withdrawn to provide for the removal or insertion of a rotary cutter 3 of any desired form.

If desired, the cutter 3 may be otherwise corrugated, as for example,—by means of rounded corrugations terminating in rounded or sinuous shaped tread portions 3ᵉ, as shown in Fig. 6 of the drawings.

From the foregoing description taken in connection with the accompanying drawings the operation and advantages of my invention will be readily understood.

Having thus described some of the embodiments of my invention, without having attempted to set forth all the forms in which it may be made, or all the modes of its use, what I claim and desire to secure by Letters Patent is,—

1. In a cake cutter, a cutter carrying bearing head having a constricted neck portion, and a handle having its end walls seated in said constricted neck portion.

2. A cake cutter, comprising a hollow handle, bearing brackets having enlarged anchor portions extending into said handle, and a rotary cutter in said brackets.

3. A hollow handle comprising two complementary handle members of channel shape in cross section connected to each other at the edges thereof and tapered and spaced apart at one end forming a constricted open end to receive a holding shank.

4. In a cake cutter, a cutter carrier having an enlarged anchor head and a constricted neck and a handle having its end seated in said constricted neck and surrounding said anchor head.

5. In a cake cutter, a bearing head made up of companion brackets having outwardly off-set sides to span the periphery of the cutter and terminating in enlarged handle receiving anchor heads.

6. A hollow handle, comprising two complementary handle members of channel shape in cross section connected to each other longitudinally and having a tapered open end to receive an article shank.

7. A cake cutter, comprising a metallic handle, bearing brackets provided with enlarged anchor portions extending into and covered by said handle, and a rotary cutter between said bearing brackets.

8. In a kitchen article, including a hollow handle, a bearing head embodying companion brackets having constriction neck and enlarged anchor portions carried within and interlocking with the end of said hollow handle.

9. In a cake cutter, a bearing head comprising companion brackets having constricted neck and enlarged anchor portions and a handle surrounding said anchor portion and closed by said constricted neck portion of said brackets.

10. A hollow handle comprising two channel shaped members having their channel portions extending towards each other and connected at their edges and terminating in a tapered constricted end to receive and interlock with a holding shank.

11. In a cake cutter, a cutter carrying bearing head made up of companion brackets having outwardly off-set sides to receive the periphery of the cutter and terminating in constricted neck portions and enlarged handle receiving anchor heads.

12. In a cake cutter, including a hollow handle having a tapered open end, a cutter carrying bearing head embodying companion brackets having constricted neck portions terminating in enlarged anchor heads carried within said tapered open end of the hollow handle.

13. A handle comprising two channel shaped members having their channel portions extending towards each other and connected by means of longitudinally extending interlocking flanges and terminating at one end in a pointed portion to receive and hold a supporting shank.

14. In a cake cutter, a hollow metallic handle having a constricted opening at one end, and a cutter carrying bearing head having a constricted neck portion extending through said constricted opening and terminating in enlarged anchor heads covered by said hollow handle.

15. In a cake cutter, a cutter carrying bearing head comprising companion bearing brackets having constricted neck portions forming a handle receiving recess and terminating in enlarged anchor heads, and a handle surrounding the latter and having its ends seated in said recess and closed by said constricted neck portion of said brackets.

In testimony whereof I have affixed my signature.

CARL A. FRAHM.